H. C. MacCONNELL.
MACHINE FOR FINISHING STEREOTYPE AND OTHER CURVED PLATES.
APPLICATION FILED JAN. 11, 1907.
Patented Dec. 9, 1919.
6 SHEETS—SHEET 1.
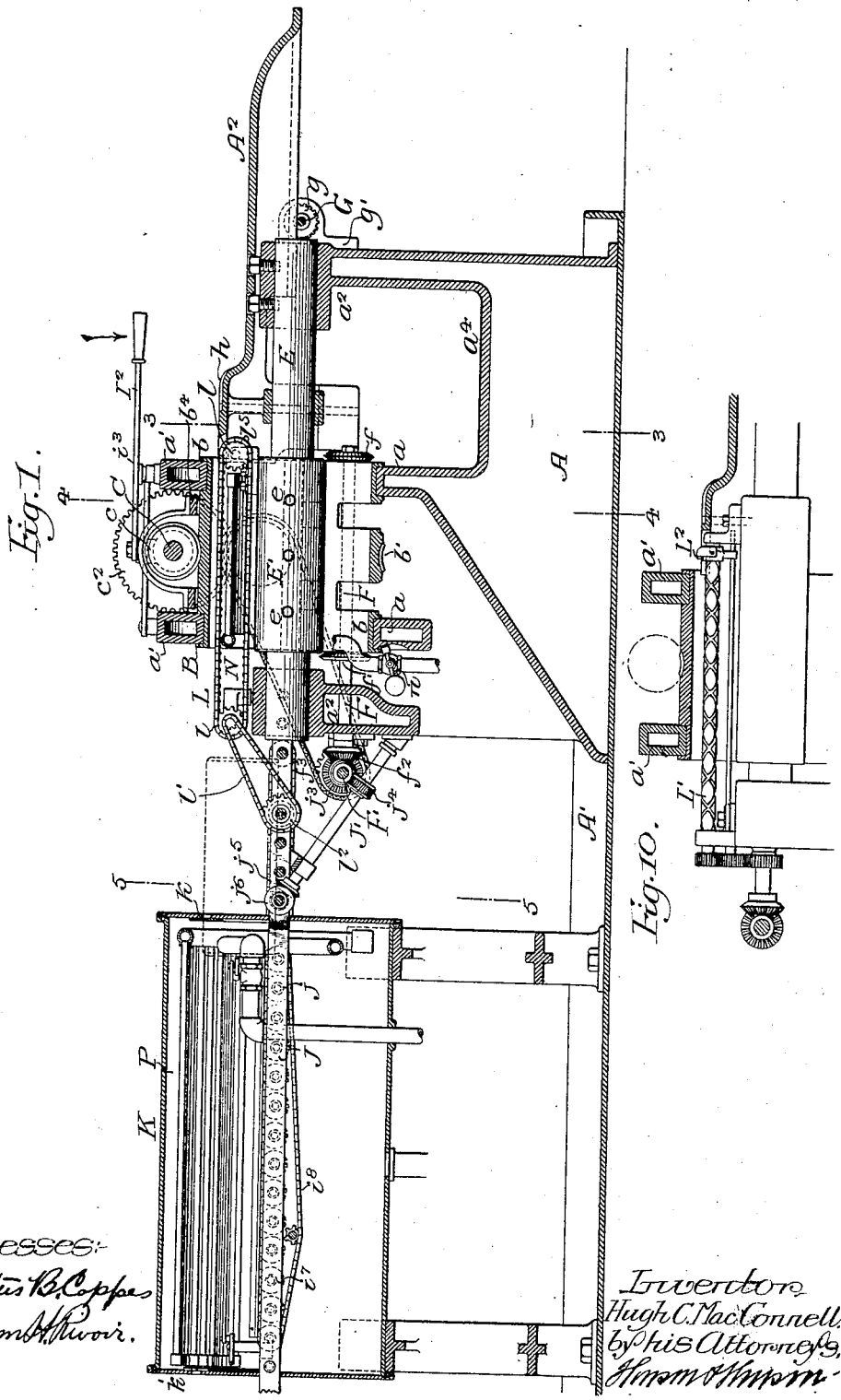

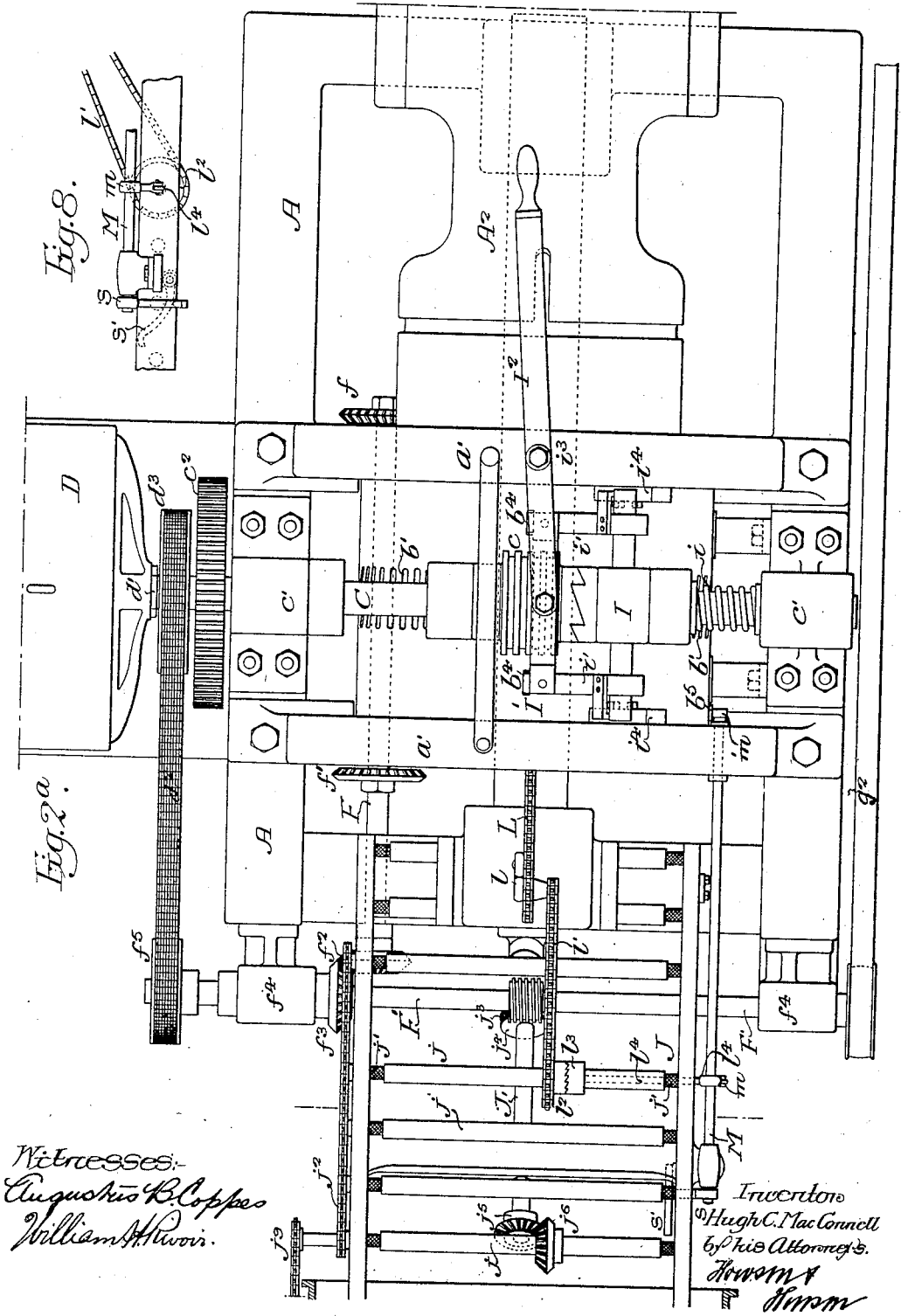

H. C. MacCONNELL.
MACHINE FOR FINISHING STEREOTYPE AND OTHER CURVED PLATES.
APPLICATION FILED JAN. 11, 1907.
1,324,562.
Patented Dec. 9, 1919.
6 SHEETS—SHEET 3.
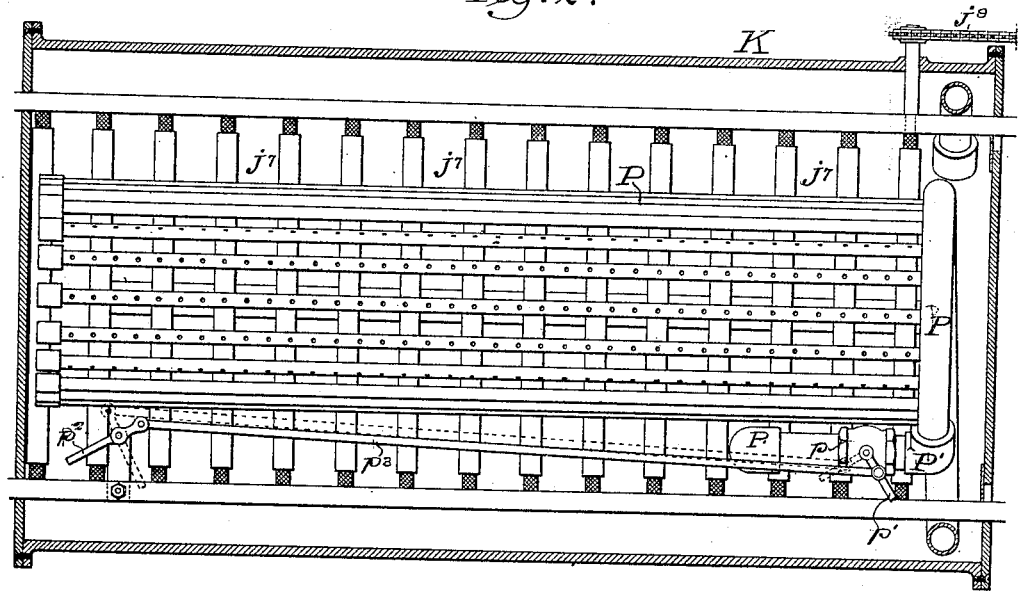
Fig. 2ᶜ.
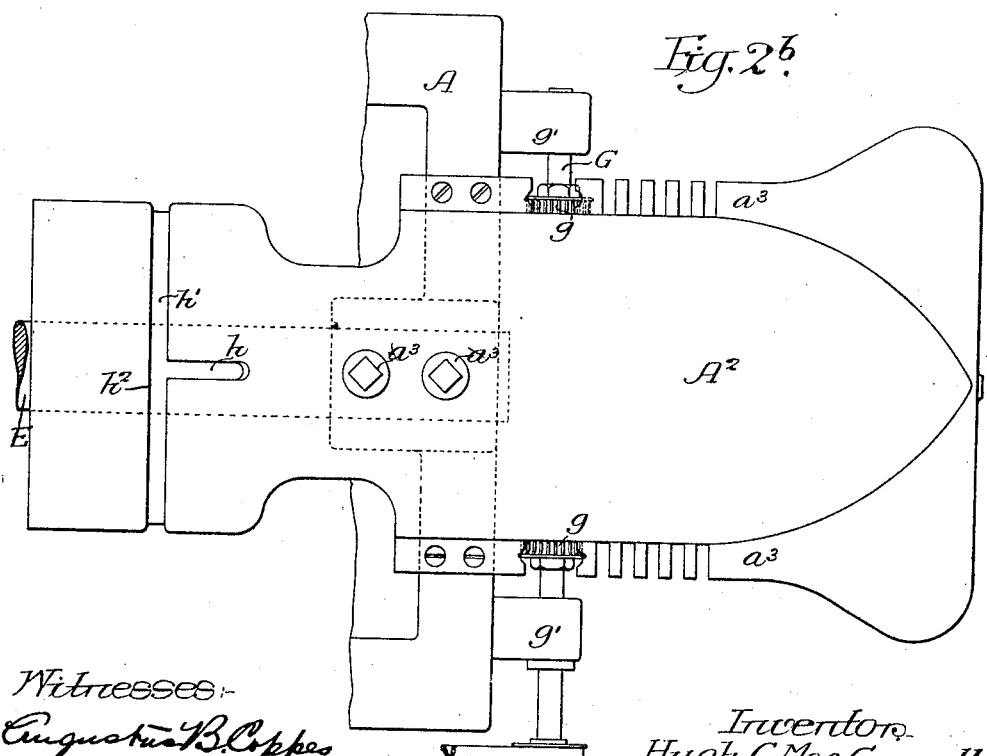
Fig. 2ᵇ.
Witnesses:—
Augustus B. Coppes
William H. Rivoir
Inventor,
Hugh C. MacConnell.
by his Attorneys
Howson & Howson

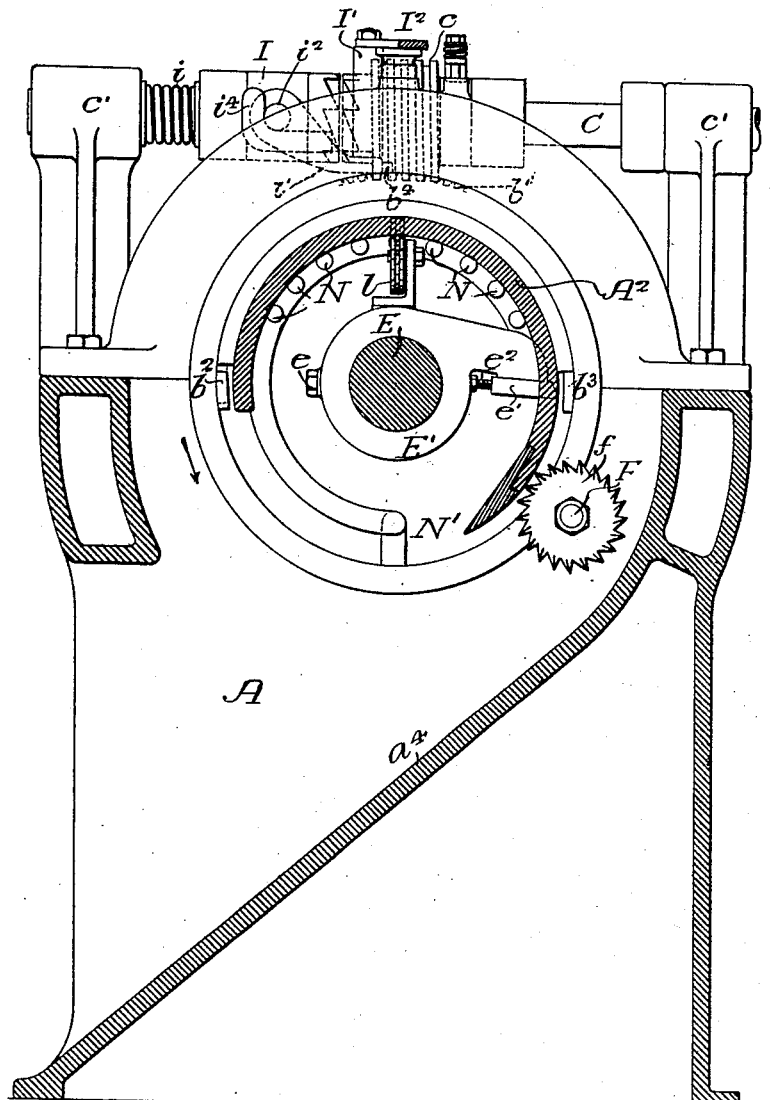

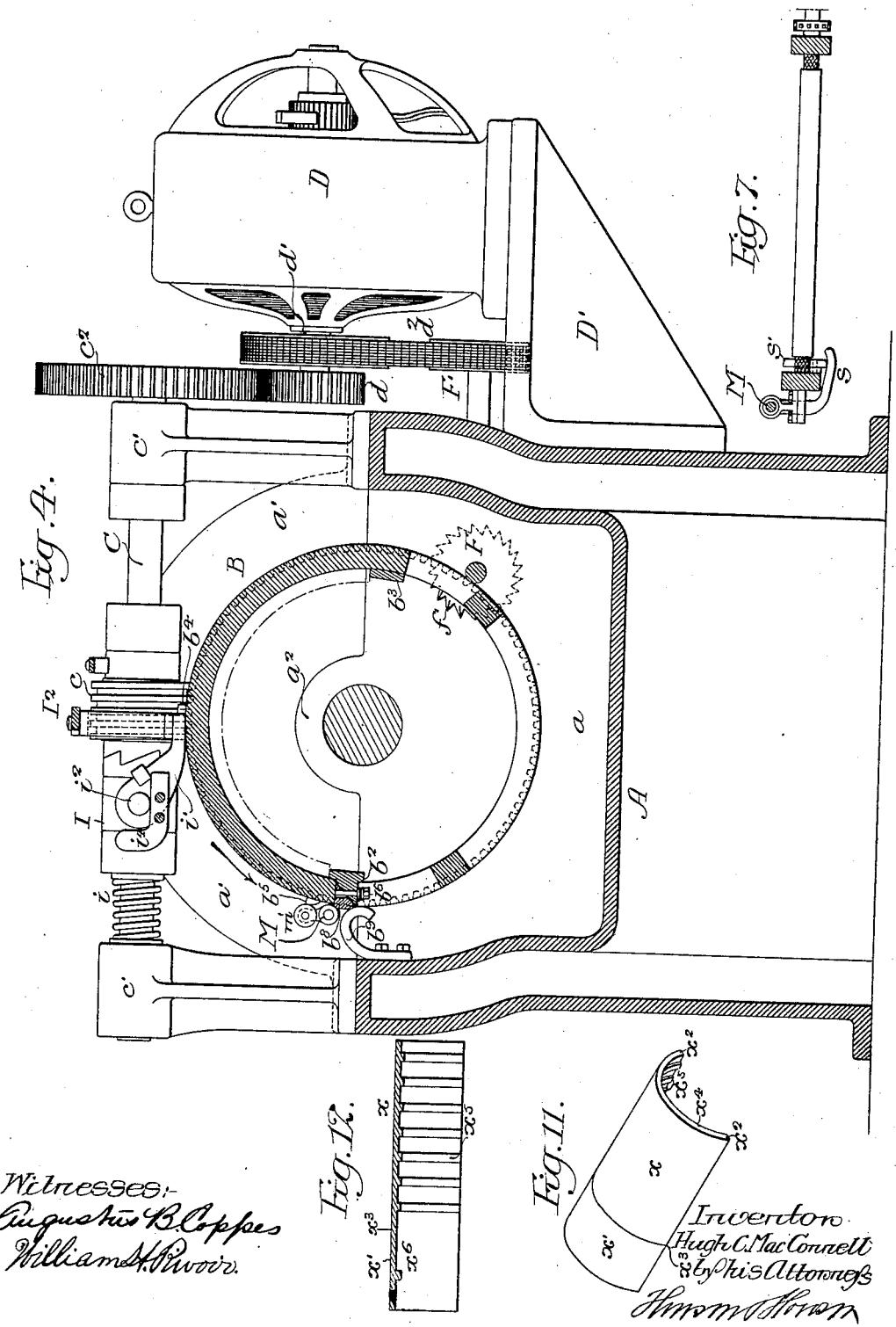

H. C. MacCONNELL.
MACHINE FOR FINISHING STEREOTYPE AND OTHER CURVED PLATES.
APPLICATION FILED JAN. 11, 1907.

1,324,562.

Patented Dec. 9, 1919.

Witnesses:—
Augustus B. Coppes
William H. Kwoir.

Inventor:—
Hugh C. MacConnell.
by his Attorneys
Hmom & Hmom

UNITED STATES PATENT OFFICE.

HUGH C. MacCONNELL, OF PHILADELPHIA, PENNSYLVANIA, ASSIGNOR TO ROBERT HOE, OF NEW YORK, N. Y.

MACHINE FOR FINISHING STEREOTYPE AND OTHER CURVED PLATES.

1,324,562.   Specification of Letters Patent.   Patented Dec. 9, 1919.

Application filed January 11, 1907. Serial No. 351,802.

*To all whom it may concern:*

Be it known that I, HUGH C. MACCONNELL, a citizen of the United States, residing in Philadelphia, Pennsylvania, have invented certain Improvements in Machines for Finishing Stereotype and other Curved Plates, of which the following is a specification.

My invention relates to certain improvements in machines for finishing stereotype and other curved plates for which Letters Patent were granted to me on the 31st day of October, 1905, numbered 803,422.

The object of the present invention is to improve the details of construction, to make the machine more automatic than heretofore, and to provide means for cooling and for removing the plate after it has been trimmed and finished.

In this machine the curved plate is taken from the mold while still hot, placed on the saddle of the machine and pushed into position within the cylindrical shell. In its passage the longitudinal edges are trimmed and slightly beveled.

When the plate is in position within the shell a lever is operated which will release the shell and automatically throw in the driving mechanism, the first movement of the shell releases a clamp which holds the plate in the shell, and as the shell with the plate is rotated the ends of the plate are beveled and the gate detached.

The inner ribs of the plate are also trimmed as the cylinder and plate rotate around a fixed knife. While in the machine water is preferably sprayed upon the plate so as to cool it.

When the cylinder reaches a certain point the discharge mechanism is automatically thrown into action and the plate is removed from the cylindrical shell and transferred onto a roller bed which conveys it into a cooling box which is supplied with spray pipes for again spraying the plate.

After the plate is cooled it is removed from the opposite end of the said box.

The above description will give a preliminary idea of the operation of the machine.

The machine is particularly adapted for trimming and finishing stereotype plates used for printing newspapers and periodicals, although it will be understood that it can be used for trimming a curved plate for any purpose.

In the accompanying drawings:—

Figure 1, is a longitudinal sectional view of my improved machine for finishing stereotype and other curved plates;

Fig. $2^a$, is an enlarged plan view of the central portion of the machine;

Fig. $2^b$, is a plan view of the front or saddle portion of the machine;

Fig. $2^c$, is a plan view of the rear portion of the machine showing the cooling box.

The three figures are drawn to the same scale and one is a continuation of the other.

Fig. 3, is a transverse sectional view on the line 3—3, Fig. 1;

Fig. 4, is a transverse sectional view on the line 4—4, Fig. 1;

Figs. 6, 7 and 8, are detached views of details of the discharge mechanism;

Fig. 9 is a view showing cams for operating one of the spray pipe valves;

Fig. 10, is a view of a modification of the plate discharge mechanism; and

Figs. 11 and 12, are views of the curved plate with the gate attached.

A is the frame of the machine supported upon a flanged bed plate A', this bed is flanged in order to catch any drip from the machine.

$A^2$ is a fixed saddle projecting in front of the machine and secured to the frame in any suitable manner. From Fig. 1, it will be noted that the forward part of the saddle is depressed, while from Fig. $2^b$ it will be seen that the sides of that portion of the saddle immediately in front of the slot $h$ hereafter referred to, are recessed; this provision of a depressed portion and recess or recesses being for the accommodation of the projecting lug usually formed by the gate on the inside of stereotype plates.

B is a cylindrical shell having annular grooves at each end in the present instance. The shell rests upon transverse bearings $a$, $a$ forming part of the frame A, the bearings extend into the grooves of the shell, as shown clearly in Fig. 1, and caps $a'$ are secured to the frame A and alined with the bearings $a$, $a$ and also rest in the groove $b$ of the shell so as to firmly hold the shell against longitudinal movement, but allowing it to freely rotate when motion is imparted to it. This arrangement makes a very steady support for the shell as a neat fit can be made between the bearings and the shell.

On the central portion of the shell is an annular rack $b'$ which meshes with the teeth of a worm wheel $c$ on a transverse shaft C. This shaft is adapted to bearings $c'$, $c'$ secured to the frame A, as clearly illustrated in Fig. 4, and has at one end a gear wheel $c^2$ which meshes with a pinion $d$ on the shaft $d'$ of the motor D. This motor in the present instance is mounted on a bracket D' secured to the frame A. The motor may be of any suitable type and while I have shown an electric motor any means may be used for driving the mechanism without departing from the essential features of the invention.

E is a fixed longitudinal bar mounted in bearings $a^2$ on the frame A and is held from turning by means of set screws or other suitable fastenings.

E' is a knife carrier secured by screws $e$ to the shaft E; $e'$ is a knife blade which can be adjusted on the carrier by means of set screws $e^2$. The blade $e'$ trims the internal ribs $x^5$, Figs. 11 and 12 of the curved plate, and is held in a fixed position while the plate is carried past it.

F is a cutter shaft on which are mounted the cutters $f$, $f'$ which bevel the ends $x^2$, $x^3$ of the plate, and the cutter $f$ also detaches the gate $x'$ from the body $x$ of the plate as the plate is rotated past the cutters.

The shaft F is driven by bevel gearing $f^2$, $f^3$ from a transverse shaft F' mounted in suitable bearings $f^4$ on the frame A of the machine. This shaft F' is driven by a belt $d^2$ directly from the armature shaft of the motor, as clearly indicated in Figs. 2ª and 4. The belt shown is a toothed metallic belt engaging the sprocket wheels $d^3$ and $f^5$ on the shafts $d'$ and F', respectively.

Figure 5:
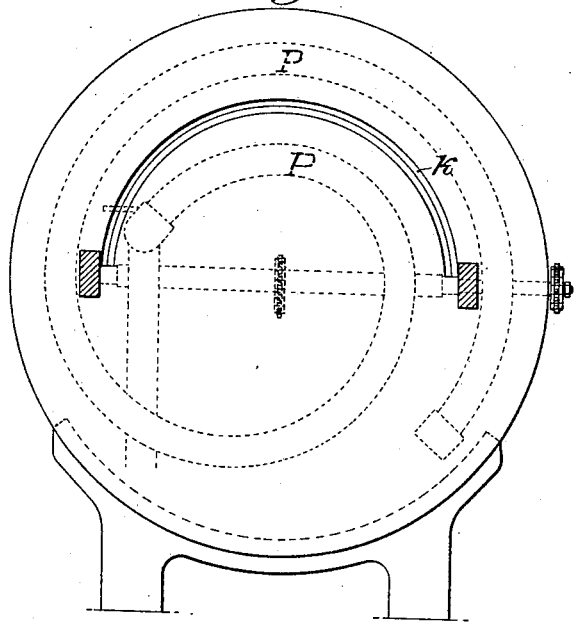
Fig. 5, is a transverse sectional view on the line 5—5, Fig. 1.

G is a transverse shaft mounted in bearings $g'$ on the front end of the frame A, Fig. 2ᵇ, and on this shaft are cutters $g$ which are so set in respect to the flanges $a^3$ of the saddle A² that when the plate travels on these flanges to enter the machine the cutters $g$, $g$ trim and slightly bevel the longitudinal edges $x^2$, $x^2$ of the plate, Fig. 5.

The shaft G is driven by a belt $g^2$ from the shaft F', as clearly illustrated in Figs. 2ª and 2ᵇ.

It will be noticed in referring to Fig. 2ᵇ that the flange $a^3$ is notched in front of the cutters $g$, $g$ so as to allow any shavings or chips which may accumulate on the flange to be pushed aside so that the plate will seat itself correctly on the flanges.

The saddle A² is preferably made in the peculiar shape shown in Figs. 1 and 2ᵇ so that the operator can have plenty of room to adjust the plate on the wide flanges of the saddle; and at the rear end of the saddle is a longitudinal slot $h$ which connects with a transverse slot $h'$, these slots act as a guide and also as a stop to limit the inward movement of the plate when introduced into the machine, as I cast, on the gate end $x'$ of the plate a lug $x^6$, Fig. 12, which alines with the slot $h$ and when the plate is pushed into position within the cylindrical shell the lug enters the slot $h$ and comes to a stop against the wall $h^2$ directly in line with the transverse slot $h'$. This arrangement seats each plate properly in position so that the knives $f$, $f'$ which trim the ends of the plate will take the proper amount of material off the plates at the proper point.

As the plate revolves with the cylindrical shell the lug $x^6$ travels in the slot $h'$ and when the gate, which is accommodated in the recesses in the side of the saddle is severed by the cutter $f$ the plate is freed from the control of the said slot and is in position to be moved out of the shell after it has been trimmed by the several cutters. The gate $x'$ falls onto the inclined portion $a^4$ of the frame and slides to one side of the machine.

It will be noticed in the drawings that the saddle A² extends only to the front end of the shell and the flanges $a^3$ of the saddle aline with internal ribs $b^2$, $b^3$ in the shell. These ribs preferably extend the full length of the shell and carry the plate, the rib $b^3$ pushes the plate past the cutters until the plate again comes to the position of rest, as indicated in Fig. 3, of the drawings.

Figure 6:
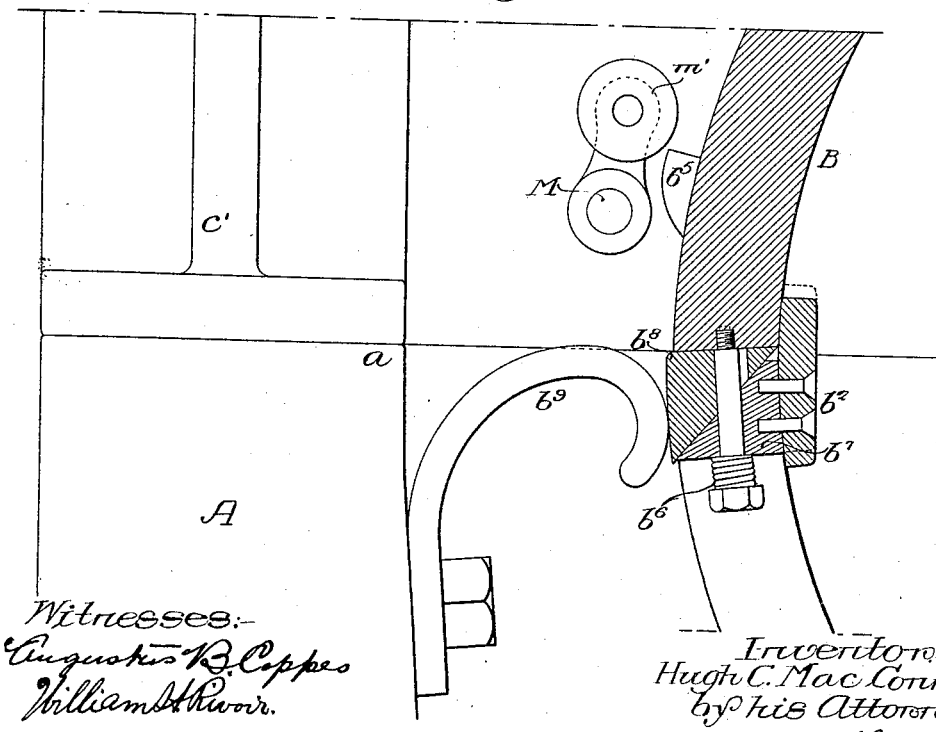

It will be noticed in Fig. 6, the internal rib $b^2$ is held in place by a spring $b^6$; and on the rear of the rib is a beveled portion $b^7$ which bears against a wedge $b^8$, this wedge is forced in by an arm $b^9$ secured to the frame A, so that when the cylinder is in position to receive the plate the rib is depressed so as to allow sufficient clearance for the plate to be inserted in the cylinder, but as soon as the cylinder commences to rotate the wedge $b^8$ passes the arm $b^9$, so that the spring $b^6$ will immediately force the rib against the plate and lock the plate rigidly to the shell.

On the shaft C is a clutch sleeve I, having teeth arranged to engage teeth on the hub of the worm $c$, a spring $i$ tends to keep the clutch in engagement.

I' is a yoke which carries two arms $i'$ with which engage lugs $b^4$ on the shell B, as indicated in Fig. 4. These arms are pivoted to trunnions $i^2$ on the clutch I.

I² is a lever pivoted at $i^3$ and attached to the yoke I' as indicated so that on pressing down the lever the arms $i'$ will be raised clear of the lug $b^4$, allowing the clutch teeth to be thrown into mesh with the teeth of the worm by the spring $i$.

It will be noticed that there are stops $i^4$ fixed to the frame of the machine which limit the rearward movement of the clutch I. By this arrangement the cylindrical shell is brought to a stop at a certain point by the lugs $b^4$ coming in contact with the arms $i'$. In order to allow a certain amount of yield the spring $i$ will cushion the arms $i'$ and as the cylindrical shell is rotated it will force the clutch out and when the clutch is disengaged from the teeth on the worm wheel the worm wheel will stop and consequently the worm will lock the cylinder in position and the cylinder in turn will prevent the clutch being forced into engagement with the teeth on the worm wheel until the arms $i'$ are raised by the lever $I^2$ when it is desired to cut another plate.

At the rear end of the machine is a roller table J having a series of rollers $j$ which have roughened surfaces $j'$ at each end upon which the edges of the plate rest when it is carried out of the shell. These rollers are driven by a chain $j^2$ which engages a sprocket wheel on the ends of the rollers, the rollers being driven from the transverse shaft F' through an inclined shaft J'. There is a worm $j^3$ on the shaft F' which meshes with the worm wheel $j^4$ on the shaft J', and this shaft in turn has a bevel wheel $j^5$ which meshes with a bevel wheel $j^6$ on one of the rollers $j$, as indicated clearly in Figs. 1 and $2^a$.

The table is continued inside of a spray box K as clearly indicated in Figs. 1 and $2^c$ and the rollers $i^7$ are driven by a chain $i^3$. The first roller in the box is driven by a chain $j^0$ which passes around a sprocket wheel on this roller, and on the roller $j$ upon which the bevel wheel $j^6$ is mounted.

The spray box is closed at both ends and has curved slots $k$, $k'$ through which the curved plate is passed. This arrangement confines the spray water to the box. Pieces of felt or other material may be arranged to form valves to close these openings if desired.

L is an endless chain which extends through the shells B, passing around sprocket wheels $l$, $l$ at each end, one of the wheels is driven by a chain $l'$ which passes around a wheel $l^2$ on one of the transverse rollers $j$. Engaging the toothed hub of this wheel is a clutch $l^3$ actuated by a rod $l^4$ extending through the center of the roller $j$ and this rod is actuated by an arm $m$ on the longitudinal shaft M which has an arm $m'$ in the path of the lug $b^5$ on the cylindrical shell B, as indicated in Fig. 6.

On the chain L is a lug $l^5$ which engages the rear end of the plate and pushes it out of the shell when the plate is finished, onto the rollers $j$. To throw the driving mechanism for the chain L out of gear I provide the shaft M with an arm $s$ which extends under another arm $s'$ in the path of the plate, as indicated clearly in Figs. $2^a$ and 7. so that when the plate comes in contact with this arm it depresses it and throws the clutch out of gear. The lug $b^5$ throws the clutch into gear when the cylinder has stopped its rotation and the plate is ready to be removed from the cylinder.

By making this mechanism automatic it will be impossible for the chain to accidentally remove the plate before it is finished and before it is in position to be removed, as it will be understood that while the plate is being cut it is held rigidly in the shell.

N is a series of water spray pipes mounted within the shell B, and P is a series of water spray pipes mounted within the casing K. The water spray pipes N are connected to a pipe N' in which is a valve $n$ actuated by cams $n'$ on the shell B so that when the shell reaches a certain point the water will be turned on and a fine spray of water will be played upon the plate by the several spray pipes, gradually and partially cooling it while in the cylindrical shell. The moment the rotation of the shell is stopped the water is cut off and the plate is removed by the endless chain and conveyed into spray boxes K.

As the plate enters the spray box it trips a lever $p'$ of the valve $p$ in the water pipe P' and the water passes through the several spray pipes and plays upon the plate while in the box. As the plate is removed from the box it actuates a lever $p^2$ connected to the lever $p'$ by a rod $p^3$ which turns the valve to cut off the water so that unnecessary waste of water is avoided.

In some instances in place of the endless chain for removing the plate from the shell, a double threaded screw L' may be used driven by a train of gears from the shaft F'. $L^2$ is a reciprocating carrier actuated by the screw and having a trip pawl which will engage the plate and push it out of the shell but when returning will fall back to pass a plate which may be in the shell and spring up back of the plate to be in position to push it forward at the next forward movement. This is clearly shown in Fig. 10.

Under operating conditions a plate, usually immediately after it has been cast and while it is still hot, is placed upon the saddle $A^2$ and pushed into the shell until the lug $x^0$ cast on the plate enters the slot $h$ and comes to rest against the wall $h^2$ thereof in line with the transverse slot $h'$. In being pushed over the saddle the longitudinal edges $x^2$ of the plate are trimmed and slightly beveled by the cutter $g$ and after said plate comes to rest within the shell, the latter is operatively connected to the motor so as to be caused to revolve, by pressing down the lever $I^2$. This permits the teeth of the clutch I, under the action of the spring $i$, to enter the corresponding teeth formed on the worm so that this latter is turned and with it the shell.

Immediately upon the beginning of this revolution, the wedge $b^8$ moves out of engagement with the arm $b^9$ so that the spring $b^6$ forces the rib $b^2$ against one edge of the plate and rigidly locks this in the shell.

Shortly after the revolution of the shell begins, the cam $n'$ acting upon the valve in the pipe N causes water to be admitted to said pipe so that a fine spray is played upon the plate, which is thus gradually, though only partially, cooled while in the shell. This flow of water is cut off by the action of the cam on the valve shortly before the shell finishes its revolution.

After the plate has turned through an arc of almost 180°, its advancing edge comes into engagement with the cutters $f$ and $f'$ so that the gate portion is severed from one of its ends and its opposite end is trimmed to the desired form.

It will be noted that the cutters, and particularly the cutter $f$, is so placed that it finishes its work of severing the gate portion of the plate only after this latter has almost reached its original position;—that is, when it is in such a position that the gate portion is largely carried by the saddle.

While I preferably mount the cutter as noted, it is to be understood that it may be placed in other positions to accomplish the same and without departing from my invention;—the object to be attained being the prevention of a premature separation of the gate portion from the body of the plate owing to the former breaking away before the cutter $f$ has finished its work.

After the advancing edge of the plate has passed the cutters $f$ and $f'$, the interior surface of the same is engaged by the knife $e'$ and is shaved or trimmed in the desired manner;—it being noted that said knife is so placed as to finish its work on the plate just before this latter has completed its revolution and comes to rest owing to the lugs $b^4$ contacting with the arms $i'$ and throwing the clutch I out of action.

Immediately before the shell has finished its rotation, the arm $b^9$ acts to release the rib $b^2$, so that the plate is released, and immediately thereafter the lug $b^5$ causes the clutch $l^3$ to connect the endless chain L with the source of power, so that the lug $l^5$ on said chain engages the rear end of the plate and pushes it out of the shell and on to the roller table J. This latter carries the trimmed plate into the spray box K and in entering this it trips a lever $p'$ so that the valve $p$ is operated, and water is delivered to the spray pipes P, thus causing the plate to be completely cooled to any temperature desired, depending upon the amount of water delivered by said pipes, which may be regulated as desired.

As the plate leaves the spray box it turns off the valve $p$ through the levers $p'$ and $p^2$.

I claim:—

1. The combination in a machine for finishing stereotype and other curved plates, of a frame, a shell mounted in the frame, means for rotating the shell, said shell having longitudinal ribs on the inner side, a saddle mounted on the frame in front of the shell and so arranged in respect to the ribs, that when the shell is at rest, the plates may be transferred from the saddle to the ribs, with means whereby one of said ribs is caused to lock a plate to the shell, substantially as described.

2. The combination in a machine for finishing stereotype and other curved plates, of a frame, a cylindrical shell mounted in bearings on the frame, means for rotating the shell, a saddle in front of the shell, a laterally projecting flange on the saddle for supporting the plate, a cutter projecting through the flange for cutting the longitudinal edge of the plate prior to its entering the shell, and means for trimming the ends of the plate as it is rotated with the shell, with means for removing the plate from the machine, substantially as described.

3. The combination in a machine for finishing stereotype and other curved plates, of a frame, a shell mounted in the frame, means for rotating the shell, said shell having an abutment, and being arranged to carry a plate to be trimmed, a stop coöperating with said abutment to limit the movement of the shell, means for lifting the stop, and trimming devices for the plate, substantially as described.

4. The combination in a machine for finishing stereotype and other curved plates, of a frame, a cylindrical shell mounted in the frame, a transverse shaft, a worm on the said shaft, an annular rack on the shell with which the worm engages, a clutch on the shaft arranged to engage the worm, a stop carried by the clutch member on the shaft, a lug on the shell arranged to come in contact with the stop, and means for lifting the stop, substantially as described.

5. The combination of a frame, a shell mounted in the frame, said shell having means for carrying a plate to be trimmed, a transverse shaft situated in front of the shell, and having two cutters, a saddle on the front of the frame, said saddle having laterally extending flanges placed to support a plate prior to its entering the shell, the cutters of the transverse shaft extending through the flanges, and means for imparting a rotary motion to the several parts, substantially as described.

6. The combination of a frame, a rotary shell adapted to bearings in the frame, means for imparting motion to the shell, said shell having internal ribs to engage a plate, a saddle in advance of the ribs on the shell and having flanges alining with the ribs on the shell so that the plate can be transferred from the saddle to the shell, with means for positively locking the plate to the shell, substantially as described.

7. The combination of a frame, a cylindrical shell mounted in the frame, means for imparting rotary motion to the shell, a fixed internal cutter for trimming the longitudinal ribs of a plate mounted in the shell, a transverse shaft, a clutch on said shaft, a projection on the shell, an arm carried by the movable member of the clutch against which the lug on the shell strikes when the revolution is completed, and a lever for raising the arm clear of the lug, substantially as described.

8. The combination of a frame, a cylindrical shell mounted on the frame, means for imparting rotary motion to the shell, longitudinal ribs on the inner walls of the shell for carrying the plate, and a saddle in advance of the shell arranged to support the plate before it enters the shell, there being a slot in the saddle for the reception of a lug on the plate to limit the inward movement of the same, substantially as described.

9. The combination of a frame, a cylindrical shell mounted in the frame and having longitudinal ribs for supporting the plate, a saddle situated in advance of the shell and having a longitudinal and a transverse slot connected to each other, the walls of the transverse slot forming an abutment for a lug on the plate, and a cutter placed to remove that portion of a plate mounted on the ribs of the shell, upon which such lug is placed, substantially as described.

10. The combination of a frame, a cylindrical shell mounted in bearings thereon, cutters for trimming the ends of a plate while it is in the shell, a stop placed out of the general path of the plate so as to be engaged by a lug projecting beyond the cylindrical surface of the plate and being arranged to limit the inward movement of said plate, with means for imparting a rotary motion to the shell, one of the cutters being placed to sever the part of the plate having said lug, substantially as described.

11. The combination of a frame, a cylindrical shell mounted in bearings thereon, a saddle in front of the shell and supported by the frame, a stop on the saddle placed out of the general path of the plate to be trimmed so as to be engaged by a lug projecting on the under side of the gate portion of a plate operated on, with cutters for trimming the plate and severing the gate portion from the body thereof, substantially as described.

12. The combination of a frame, a cylindrical shell mounted in the frame, means for imparting motion to the shell, a saddle in front of the shell and having flanges, said saddle having a longitudinal slot for the reception of a lug on the plate to be trimmed and a transverse slot, the walls of the transverse slot forming an abutment for the lug on the plate to be trimmed with cutters for trimming a plate in the shell, substantially as described.

13. The combination in a machine for finishing stereotype and other curved plates, of a frame, a shell mounted on the frame so as to receive a plate to be trimmed, means for rotating said shell, a knife for trimming the inside of a plate while it is within the shell, means for removing the plate from the shell, and automatic mechanism having a part placed to be actuated by the shell for setting said means in operation, substantially as described.

14. The combination of a frame, a cylindrical shell mounted in the frame so as to be free to receive within it a plate to be trimmed, means for rotating the shell, cutters for trimming the plate carried by the frame, an endless chain extending through the shell, a lug on the chain, means for imparting motion to the chain, and automatic mechanism having a part placed to be actuated by the cylindrical shell for setting the chain in motion so that the lug thereof will engage the plate and remove it from the shell, substantially as described.

15. The combination of a frame, a cylindrical shell having a lug, cutters for trimming a plate carried by the shell, a longitudinally arranged chain extending through the shell and having a lug thereon, means for imparting motion to the chain, and a clutch for connecting the chain to a source of power, with a rod arranged to actuate the clutch and placed to be operated by the lug on the cylindrical shell, substantially as described.

16. The combination of a frame, a cylindrical shell having a lug, cutters for trimming a plate carried by the shell, a longitudinally arranged chain extending through the shell and having a lug thereon, means for imparting motion to the chain, a clutch for connecting the chain to a source of power, with a rod arranged to control the operation of the clutch, an arm in the path of the plate and operatively connected to the rod, for throwing the clutch out of action, with a second arm in the path of the lug on the shell and also connected to the rod, for throwing the clutch into action, substantially as described.

17. The combination of a frame, a cylindrical shell mounted in bearings on the frame so as to be rotatable, and constructed to receive within it a plate to be trimmed, two longitudinal ribs, one of said ribs being movable to clamp a plate in the shell, with means arranged to engage said rib for withdrawing the same to release the plate when the shell is in its normal position, substantially as described.

18. The combination of a frame, a shell mounted in the frame, means for rotating the shell, longitudinal ribs within the shell, one of said ribs being movable and having a beveled portion, a spring tending to force the movable rib toward the other rib, a beveled wedge resting against said beveled portion, and a structure on the frame arranged to contact with the wedge and move the rib against the pressure of the spring, substantially as described.

19. The combination of a frame, a cylindrical shell, cutters for trimming a plate carried by the shell, a longitudinally arranged chain extending through the shell and having a lug thereon, means for imparting motion to the chain, a clutch for connecting the chain to a source of power, with means actuated by a plate for throwing the clutch out of action and other means actuated by the shell for throwing the clutch into action, substantially as described.

20. In combination, a supporting frame, a revoluble shell mounted thereon, finishing means coöperative therewith, and spraying pipes mounted within the shell.

21. In combination, a supporting frame, a revoluble shell mounted thereon, finishing means coöperative therewith and a spraying device mounted within the shell.

22. In combination, a supporting frame, a plate support mounted thereon, plate finishing means, means for operatively moving said plate support and said finishing means relatively to each other, and a spraying device mounted within said plate support.

23. The combination with a support adapted to hold a stereotype plate, plate finishing mechanism, and mechanism for moving said support and said plate finishing mechanism relatively to each other, of means for spraying a cooling fluid upon the exposed side of said plate during said plate finishing operation.

24. The combination of a finishing cylinder having two supports within the same, one of which is movable, for holding a stereotype in said cylinder, means for rotating the cylinder, and means operated by the rotation of the cylinder for causing movement of said movable support to clamp and unclamp said stereotype.

25. In combination, a drive shaft, a rotatable support, plate finishing means adapted by the rotation of the support to engage a plate and finish the same, means for throwing said support rotating mechanism into engagement with said support, means for disengaging said support rotating mechanism automatically upon the completion of the rotation of said support, forwarding rollers adapted when rotated to forward a stereotype plate, mechanism adapted to normally drive said forwarding rollers, mechanism adapted by the rotation of said support to stop the drive of said forwarding rollers, and mechanism connected with said support driving mechanism and adapted upon the cessation of the rotation of said support to again set into operation said roller driving mechanism.

26. In combination, a rotatable support adapted to receive a stereotype plate therein, mechanism adapted to rotate said support, a plate finishing mechanism adapted by the rotation of the support to finish a plate, positive means for forwarding a plate, means for normally driving said forwarding means, mechanism operated by the forward movement of said plate to stop said forwarding means during the rotation of said support, means for automatically stopping the rotation of said support after said plate is finished, and mechanism automatically operated to again set in operation said driving mechanism.

27. In combination, a rotatable support adapted to receive a stereotype plate therein, mechanism adapted to rotate said support, plate finishing mechanism adapted by the rotation of said support to finish a plate, rollers adapted by their rotation to forward a plate, means for normally driving said rollers, mechanism operated by the forward movement of said plate to stop said roller driving mechanism, means for automatically locking said plate in said support at the commencement of its rotation and for automatically releasing the same at the cessation of the rotation, means for automatically stopping the rotation after said plate is finished, and mechanism automatically operated to again rotate said forwarding rollers.

28. In combination, a rotatable support adapted to receive a stereotype plate therein, mechanism adapted by the rotation of said support to finish said plate, rollers adapted to forward a plate, means for normally driving said rollers, mechanism operated by the forward movement of said plate to stop said roller rotating mechanism, a hand lever adapted for throwing said support rotating mechanisms into operation, means for automatically stopping the rotation of said support after said plate is finished, and mechanism automatically operated to again rotate the forwarding rollers.

29. The combination of a frame, a cylindrical shell mounted in bearings thereon, cutters for trimming the ends of a plate while it is in the shell, a stop placed out of the general path of the plate so as to be engaged by a lug projecting beyond the cylindrical surface of the plate and being arranged to limit the inward movement of said plate, with means for imparting a rotary motion to the shell, one of the cutters being placed to sever the part of the plate having said lug.

30. A stereotype plate finishing apparatus having a member for engaging a projection on the rear side of a stereotype plate and for causing the plate to assume the proper position in the finishing means, and means carried by the finishing means capable of removing that portion of the plate which carries the lug or projection while the plate remains in the same relative longitudinal position within the machine.

31. A machine for finishing curved stereotype plates having a member for engaging a projection on the concaved side of the curved stereotype plate and for causing the plate to assume the proper position in said machine and means carried by the finishing means capable of removing that portion of the plate which carries the projection while the plate remains in the same relative longitudinal position within the machine.

32. A machine for finishing curved stereotype plates having a member for engaging a projection on the concavel side of the curved stereotype plate and for causing the plate to assume the proper position in the said machine and means carried by the finishing means capable of removing the projecting portion from the body of the plate while the plate remains in the machine.

33. The combination of a frame, a cylindrical shell mounted in bearings thereon, a saddle in front of the shell and supported by the frame, a stop on the saddle placed out of the general path of a plate to be operated on, with cutters for trimming the plate and severing the gate portion from the body thereof.

34. In a machine for finishing curved stereotype printing plates, the combination of a saddle for receiving the plates, a shaft extending in the direction of feed of the plates, a shaving device thereon, a stop for arresting the plates located between the saddle and shaving device.

35. In combination, a stereotype support adapted to receive a stereotype plate therein, mechanism adapted to rotate said support, plate finishing mechanism adapted by the rotation of said support to finish a plate, rollers adapted by their rotation to forward a plate, means for normally driving said rollers, mechanism operated by the forward movement of said plate to stop said roller driving mechanism, means for automatically locking said plate in said support at the commencement of its rotation and for automatically releasing said plate at the cessation of the rotation, a hand lever adapted for throwing said support rotating mechanism into operation, means for automatically stopping the rotation of said support after said plate is finished, and mechanism automatically operated to again rotate said forwarding rollers.

36. The combination of a cooling bath, with means for rotating a plate while in cooling relation with the bath.

37. The combination of a rotary plate carrier, a cooling bath, and means for rotating the carrier while the plate is in cooling relation with the bath.

38. The combination of a rotary plate carrier, a cooling bath located within the carrier, and means for rotating the carrier while the plate is in cooling relation with the bath.

39. The combination of a rotary plate carrier, means for clamping a plate in the carrier, a cooling bath, means for rotating the carrier to carry the plate past the bath to cool it, and means for releasing the cooled plate from the carrier.

40. The combination of a rotary carrier, a spraying device, and means for rotating the carrier past the spraying device.

41. The combination of a rotary plate carrier, means for clamping a plate in the carrier, a spraying device, means for rotating the carrier to carry the plate past the spraying device to cool it, and means for releasing the plate from the carrier.

42. The combination of a rotary plate carrier, means for clamping the plate in the carrier, a spraying device arranged to spray the inside of the plate, means for rotating the carrier to carry the plate past the spraying device, and means for releasing the plate from the carrier.

43. The combination of a cooling bath, means for rotating a plate while in cooling relation with the bath, and means also acting during the rotation of the plate to finish it.

44. The combination of a cooling bath, means for rotating a plate while in cooling relation with the bath, and means also acting during the rotation of the plate to finish it on the inside.

45. The combination of a rotary plate carrier, plate finishing means located therein and coöperating therewith, a cooling bath located in the carrier, and means for rotating the carrier whereby the plate is acted on by the finishing means and the cooling bath.

46. In a machine for finishing cast plates, the combination of a holder, a finishing mechanism mounted therein, means for applying a cooling fluid to the cast plates while being finished, and means for subsequently completing the cooling of the plates.

47. In a plate finishing machine, the combination of a holder for receiving the plates while being finished, means for preliminarily cooling the plates in the holder by applying a cooling fluid thereto, and means for carrying forward the cooling of the plates after they are discharged from the holder.

48. In a machine for cooling and finishing cast plates, the combination of a finishing device, means for preliminarily cooling the plates while being finished therein by applying a cooling fluid thereto, a cooling device for cooling the plates after finishing, means in the cooling device for directing a cooling fluid against the plates and carrying forward the cooling operation, and a trough connected with said cooling device for receiving the discharged fluid from the finishing device and from the cooling device.

In testimony whereof, I have signed my name to this specification, in the presence of two subscribing witnesses.

HUGH C. MacCONNELL.

Witnesses:
E. R. LOUGHERY,
WM. A. BARR.